Jan. 19, 1954 M. CAMRAS 2,666,813
MAGNETIC DUPLICATING METHOD AND MEANS
Filed Jan. 12, 1949

Inventor
Marvin Camras
by [illegible] Attys

Patented Jan. 19, 1954 2,666,813

UNITED STATES PATENT OFFICE 2,666,813

MAGNETIC DUPLICATING METHOD AND MEANS

Marvin Camras, Chicago, Ill., assignor to Armour Research Foundation of Illinois Institute of Technology, Chicago, Ill., a corporation of Illinois Application January 12, 1949, Serial No. 70,449

14 Claims. (Cl. 179—100.2)

This invention relates to a recording duplicator and more particularly to a device employing a unique method of producing duplicate records from a master magnetic recording.

In one method of magnetic recording, a lengthy magnetizable record medium which comprises a master tape and a copy tape are drawn across an electromagnetic transducer head assembly at substantially uniform linear velocity. The head assembly includes a magnetic core member having a nonmagnetic gap on one side of the core over which the master tape is led and a similar gap on the opposite side of the core over which the copy tape is led. The head assembly is provided with suitable current-conducting exciting elements to produce a magnetic field across the gaps for the master tape and the copy tape.

During the recording operation, current is caused to flow in the exciting elements in accordance with time variations of an intelligence to produce a time varying magnetic field in the core in accordance with the value thereof. The lengthy magnetizable medium of the copy tape is subjected to the influence of this field as it is drawn therethrough, and magnetization is imparted to the incremental length of the medium in accordance with time variations of the intelligence on the master tape, thus causing variations in the magnetization of the medium along its length in accordance with the time variations of the intelligence.

Depending upon the arrangement and construction of the exciting elements, various magnetic fields may be produced which are identified, respectively, as longitudinal fields, transverse fields, or vertical fields. The distinction in these different types of magnetic fields lies, of course, in the direction taken by the magnetic lines of force with respect to the dimensional axis of the magnetic recording medium. For the purpose of the disclosure of my invention, the several embodiments thereof are disclosed utilizing a longitudinal field, although it is to be understood that it is within the scope of the invention that the other fields may be utilized.

During reproduction, the lengthy magnetizable medium is drawn across the same or similar head assembly to set up a flux in the core portion thereof in accordance with the magnetization of the medium along successive incremental lengths as it passes across the gap of the magnetic core member. The resultant time varying flux induces voltage in the coil with which the flux is linked in accordance with the time-wave changes thereof. This voltage may be amplified and suitably reproduced by a loud-speaker or similar device to reproduce the intelligence recorded.

A duplicating device constructed in accordance with my invention utilizes the characteristics of a magnetizable medium which has been suitably magnetized in accordance with the time variations of a given intelligence, to influence a duplicate magnetizable medium, thereby imparting a similar magnetization to the duplicate medium. This, therefore, constitutes one object of my invention.

Another object of my invention is to provide an improved method of producing duplicate copies of a master where the master is a magnetized material and the blank used for the duplicate copy is made of a material capable of being magnetized.

Another object of my invention is to provide a method of producing record copies by drawing a paramagnetic blank and a magnetized master record, spaced apart by a special head which comprises a core excited with a high frequency magnetization.

A further object of my invention is to provide a method of transferring a magnetic pattern present on a master record to a magnetizable record blank, which is accomplished by the master tape being led over a gap on one side of the core and the copy tape over a similar gap on the opposite side of the core.

A further object of my invention is to provide a method of producing magnetic sound record duplicates from a master magnetic sound recording by a duplicating process in which the flux of the master record is conducted by the magnetic core of the electromagnetic transducer head to the copy tape and at the same time a high frequency component of magnetization is superimposed to effect the recording.

Another object of my invention is to provide a method of simultaneously duplicating a plurality of magnetic patterns appearing on a single master magnetic record on a blank record capable of being magnetized.

Another object of my invention is to provide an arrangement for duplicating magnetic patterns induced on a master record to a paramagnetic record blank by threading the record media onto a simplified driving mechanism which does not necessitate the use of elaborate system for producing constant linear speed of the record media, and passing the record media over a special head interposed therebetween which consists of a core excited with a magnetic transfer field.

A further object of my invention is to provide a method whereby magnetic patterns present on a master record may be transferred to a paramagnetic record blank with great rapidity.

A further object of my invention is to provide a method producing magnetic record copies economically.

Another object of my invention is to transfer a magnetic pattern from a master magnetic record made of a material having a high coercive force to a paramagnetic copy material having a proportionately lower coercive force, by drawing the master record and the copy over a special head in which the master record is led over a gap on one side of the core and the copy record over a similar gap on the opposite side of the core within a high frequency magnetic transfer field.

A further object of my invention is to provide a novel duplicating mechanism by which records can be produced economically and which is simple in operation.

Another object of my invention is to provide an improved method for producing duplicate magnetic recordings from a single master magnetizable recording medium.

Another object of my invention is to transfer a magnetic pattern from a master magnetic record to a paramagnetic copy material having substantially the same coercive force, in which the master record is led over a gap on one side of the core of a special head in which the core is excited with a high frequency magnetization wherein a high frequency field is present in the gap at the copy record but not at the master record.

Another object of my invention is to provide means for duplicating a magnetic recording which is efficient and useful for its intended purpose.

Other objects and features of my invention will become evident to those skilled in the art through reference to the following detailed description and the appended drawings, in which I have described the manner of construction, organization and methods of operation of preferred embodiments of my invention.

My invention is illustrated and is herein explained in connection with a lengthy magnetizable medium taking the form of a tape-like record, however, the magnetic pattern appearing on any given form of the magnetic record may comprise any number of tracks being in the same or in opposite directions.

It will, of course, be understood that the principles of my invention are equally applicable to magnetizable records of various shapes and configurations bearing any conceivable magnetic pattern and the disclosures herein set forth are by way of illustrating preferred examples only.

Figure 1:
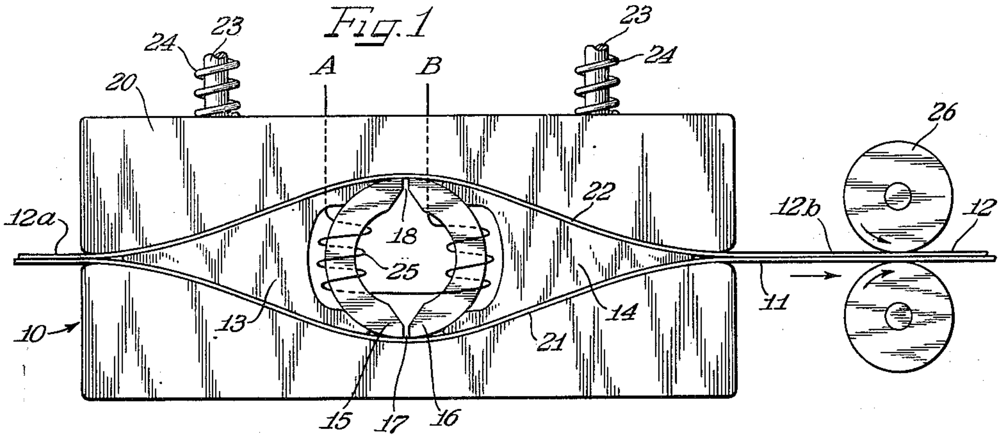
Figure 1 is an elevational view of an embodiment of my duplicating device which is especially adapted for transferring an intelligence from a master magnetic record made of a material having a high coercive force to a paramagnetic copy material having a proportionally lower coercive force.
Figure 2:
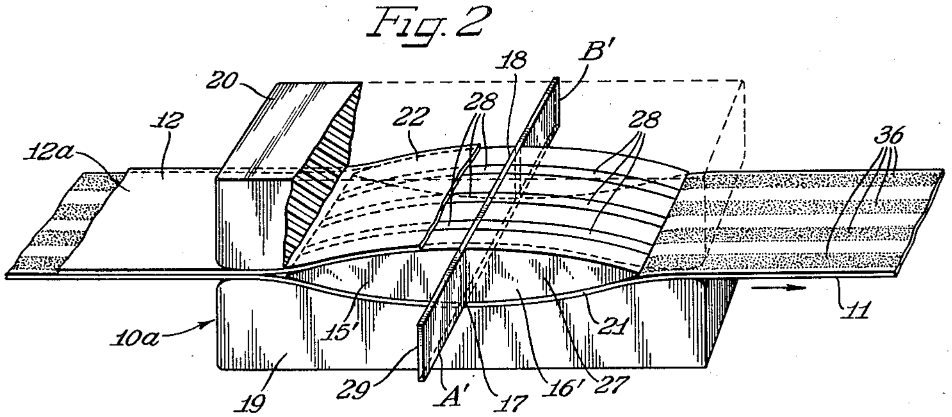
Figure 2 is a sectionalized perspective view of a multiple channeled copying head of my duplicating device; and, Figure 3 is a view in elevation of another embodiment of the copying head of my invention for transferring a magnetic pattern from a master magnetic record to a paramagnetic copy material of the same material as the master magnetic record.
Figure 3:
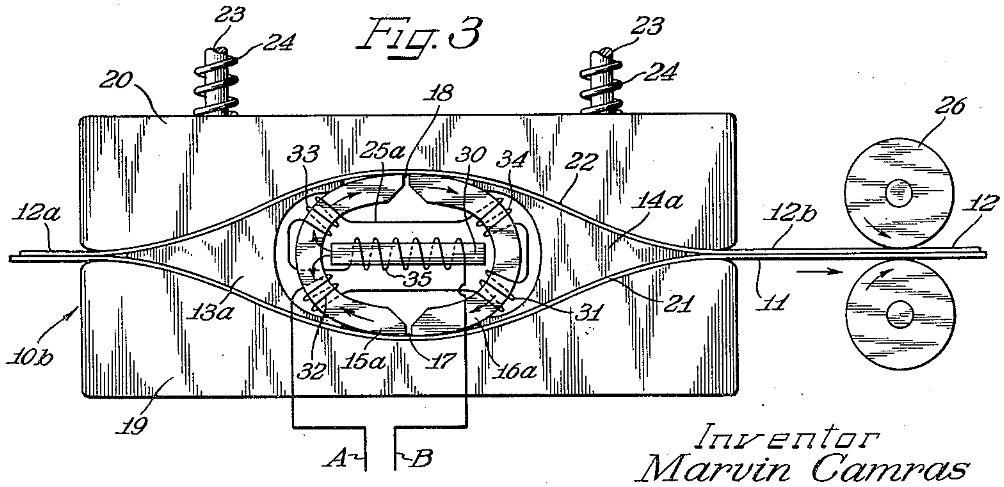

Referring particularly to Figures 1, 2 and 3, illustrating the preferred embodiments of my invention and wherein like reference characters will indicate the same or similar parts, a magnetic sound recording duplicating device is indicated generally at 10, 10a and 10b for transferring a magnetic pattern from a master magnetic record 11 to a paramagnetic copy record 12. The magnetizable copy record medium is indicated as comprising a blank record portion 12a (before transfer) and a duplicate magnetic record portion 12b (after transfer).

Referring to Figure 1, the duplicating device 10 preferably comprises symmetrically positioned guide blocks 13 and 14 made of a non-magnetic material suitably shaped to define a record guiding groove on the opposite faces thereof for the master magnetic record 11 and the paramagnetic copy record 12. The guide blocks 13 and 14 serve to mount symmetrically formed magnetic cores 15 and 16 which are suitably spaced apart to form a non-magnetic gap 17 contiguous to the master magnetic record 11 and an oppositely positioned non-magnetic gap 18 contiguous to the paramagnetic copy record.

Although the guide and the magnetic core have been illustrated as being formed separately, it is within the scope of my invention that they may be molded as one piece comprising a guide portion of non-magnetic material and a core portion formed of magnetic material.

The head portion comprising the guide construction and the magnetic core are suitably mounted in a stationary backing shoe 19 and a reciprocal backing shoe 20 is positioned above the guide block construction and spaced therefrom to provide, respectively, record guiding grooves 21 and 22 for the master magnetic record 11 and the paramagnetic copy record 12.

The backing shoe 20 may be reciprocated by a conventional spring-pressed structure for adjustable and resilient compression on the record media, thereby assuring that a good surface contact is maintained between the contiguous surfaces of the electromagnetic transducer head and the master record 11 and the blank record 12a while the record media are in the duplicating device 10.

As shown in each of the embodiments, the backing shoe 20 is attached to a pair of support rods 23 which are surrounded by a pair of coiled springs 24.

The magnetic cores 15 and 16 are provided with a high frequency winding 25 and the coils on the cores are so wound that the flux generated therein is additive. Leading to and from the winding 25 are the terminal leads, designated A and B, for connection with a source of high frequency electric current.

The record blank 12a and the master record 11 may be coiled around spools or other suitable supporting means from which they may be drawn through the duplicating device 10, after which they are again suitably coiled and stored on a conventional form of driving mechanism having a powered or manually operated take-up reel. A conventional drive system 26, which need not be a constant speed drive system, since any variations in speed will affect both tapes simultaneously may be used. Inasmuch as the details of construction of this driving mechanism are not per se a part of the present invention, the mechanism is not shown or described in further detail.

In another embodiment of the invention, Figure 2, an arrangement for producing duplicate magnetic recordings is indicated as comprising a duplicating device 10a having a transfer magnetic core construction 27 shaped as illustrated. The magnetic core construction 27 is formed from magnetic material having a high permeability as is the core of the previous embodiment. The multiple channel copying head 27 is formed from thin magnetic core material and the multiple channels are formed by non-magnetic spacers 28. Although it is preferred to form the magnetic sections formed by the spacers 28 from laminated magnetic material, the magnetic sections however may be formed from powdered material and molded to the shape illustrated.

A conducting shim 29, preferably of copper, spaces the symmetrical halves 15' and 16' forming combined magnetic cores and guide blocks of the copying head 27 and forms respectively the lower and upper non-magnetic gaps 17 and 18. Terminals A' and B' provide connections for a high frequency current from a suitable source which will induce a high frequency magnetic field in the magnetic core material of the symmetrical sections of the multiple chanel copying head 27.

Although this embodiment has been illustrated in connection with a multiple channel copying head, it is obvious that the same construction may be used for a single channel copying head. The conventional drive system 26 previously described may be used for drawing the tapes 11 and 12 through the copying head.

Referring now to Figure 3, an alternative embodiment of my invention is indicated as comprising a duplicator device 10b having a transfer magnet construction substantially similar to that of the embodiment of Figure 1 comprising guide blocks 13a and 14a and their magnetic cores 15a and 16a shaped as illustrated forming the non-magnetic gaps 17 and 18 and also to provide a chamber for receiving an elongated high permeability magnetic core member 30. A high frequency winding 25a is wound upon the magnetic cores 15a and 16a and the additional core member 30, as illustrated, and is connected to a source of high frequency current through the terminals A—B.

The high frequency winding 25a of the transfer head provided by the magnetic cores 15a and 16a gives an effective high frequency field at the copy record 12a but a negligible or inappreciable field at the master record 11.

Coils 31, 32, 33 and 34 are wound as illustrated and set up a circulating field around the head as illustrated by the arrows. Coil 35 on the core member 30 sets up a field which adds in the upper part at 34 and 33, but which opposes in the lower part at 31 and 32. The high frequency circuit 25a can be so adjusted as to produce a negligible high frequency field at the lower gap 17 and a proper recording field at the upper gap 18.

In the proposed system for duplicating magnetic records utilizing the duplicating devices 10, 10a and 10b of my invention, the tapes 11 and 12 are drawn together over a special head of the several embodiments which consisted of a high permeability magnetic core excited with a high frequency magnetization, as illustrated and described above for each of the embodiments. In each of the embodiments of my invention, the master tape 11 is led over a gap 17 on one side of the magnetic core and the copy tape 12 is led over a similar gap 18 on the opposite side of the core. The width of the air gaps 17 and 18 is preferably established so as to be small enough to resolve the shortest wave length of the intelligence to be transferred. The gap lengths are generally of the same order of dimensions as are used in conventional magnetic transducer heads for recording and play-back.

The flux of the master record 11 is conducted by the magnetic core to the copy tape 12; and, at the same time in each of the embodiments of the invention, a high frequency component of magnetization is superimposed to effect the recording. The tapes 11 and 12 need not be driven by a constant speed drive system since any variations in speed will affect both tapes simultaneously. Thus with the methods disclosed in connection with the embodiments of my invention, sharper recordings can be obtained with better high frequency response and also with longitudinal records the response does not fall off at low frequencies as in the case for direct contact printing in which master record and the copy tape are run together in contact over the same gap of a transfer magnet.

The embodiment of Figure 1 is particularly adapted for duplicating magnetic records in which the coating of the master tape is different from that of the copy tape in that the coercive force is greater than that of the material of the copy tape. The field strength of the high frequency field is such that it does not affect the master tape. The flux of the master record is conducted by the magnetic core to the copy tape and the high frequency component of magnetism is superimposed to effect the recording.

The process of duplicating magnetic records of the embodiment of Figure 2 is substantially the same as that of Figure 1 with the difference however as pointed out above that the transfer head is so constructed to duplicate, for example as illustrated, simultaneously four forms of intelligence on a master copy as indicated by the stippling 36. This intelligence on the master copy may be the same or different intelligence and the resulting copies therefrom may be used as copied or separated into individual copies.

The embodiment of Figure 3 is particularly adapted for duplicating intelligence from a master record onto a copying record in which the master record and the copying tape are formed from the same material or it is even possible to use a copy material of higher coercive force than the master. As previously described above, the high frequency field is adjusted to an inappreciable value at the lower gap so that it does not affect the master record and is adjusted at the upper gap to produce a proper recording field by the high frequency component at the same time superimposed on the flux of the master record to effect the recording.

Although the preferred embodiments of the invention have been disclosed utilizing a high frequency magnetic field to effect the duplication, it is also within the scope of the invention that the duplication may be effected by utilizing a direct current source for energizing the magnetic core. When used in this manner, however, it is necessary that the copy tape shall be suitably saturated with a D. C. magnetization rather than as in the preferred method using high frequency A. C. excitation of the magnetic core of the transfer head where it is necessary to use a demagnetized copy medium. It is also within the scope of the invention to use permanent magnets either external or by making the pole pieces themselves of retentive material. This would eliminate the need for windings on the magnets.

It is important that the transfer gaps shall line up with the records which are usually at right angles to the direction of tape motion. To insure this, it is well to provide an adjustment for varying the angle that the tapes make with the gaps.

In the preferred high frequency method of duplicating of my invention, the duplicating head of the various embodiments of my invention is preferably used with an eraser head which operates to demagnetize the record blank 12a in a conventional manner with a decreasing A. C. field. It will be apparent that if the record medium is known to be free of magnetic variations, the erasure procedure may be omitted.

After erasure, the blank record 12a is introduced into the duplicating device of either of my embodiments and spaced from the master record 11 by the magnetic head as described above.

The high frequency core 25 and the modifications thereof of each of the embodiments is energized by a high frequency A. C. excitation to produce a magnetic transfer field and the record media are drawn across their respective air gaps 17 and 18. As shown in Figures 1, 2 and 3, the blank record 12a and the master record 11 are urged in firm contact with the magnetic transfer head by the resilient coaction of a reciprocal pressure pad 28 and the guide construction formed by the complementally formed guides and the stationary and reciprocal backing shoes 19 and 20, thereby insuring that a close contact engagement of the record media is maintained as they pass contiguous to their respective air gaps of the magnetic transfer field. The vectorial summation of the transfer field and the master components results in a magnetization being imparted to the record blank 12a which corresponds to the magnetic pattern established in the master record 11 thereby producing a duplicate magnetic record 12b which is a faithful copy of the master record 11. The copy record may be stabilized in a magnetic field produced by a stabilizer, as disclosed and claimed in my copending application Serial No. 58,403, filed November 5, 1948.

Although it is to be understood that it is preferred to use high frequency A. C. excitation to produce a magnetic transfer field in the embodiments of my invention, it is also within the scope of the invention that the device may be operated using D. C. current for the excitation field. When used in this manner, the duplicating device of my invention must be used with an eraser head which operates on D. C. current to induce in the record blank 12a by means of a magnetic field, a condition of saturation.

After the record blank 12a is placed in a condition of saturation, the record blank 12a and the master record 11 are placed in the duplicating device 10 as previously described.

The magnetic core of the duplicating device is then energized by a D. C. excitation to produce a magnetic transfer field in the magnetic core in opposition to the saturation of the blank record 12a of such a magnitude as would reduce the saturation magnetization to approximate zero. As shown in the figures, the blank record 12a is urged into firm contact with the magnetic transfer head as is the master record 11 as previously described. The vectorial summation of magnetic field components produces a modulation of the magnetization in the saturated record blank 12a which corresponds to the magnetic pattern established in the master record 11, thereby producing a duplicate magnetic record 12b which is a faithful copy of the master record 11.

It may be then desirable to subject the magnetized copy record to an A. C. magnetic stabilizing field so as to "age" this copy record. This may be done within an A. C. magnetic field established by a suitable stabilizer.

The eraser head used in conjunction with either of the above methods may be energized by A. C. or D. C. current.

It is also within the scope of the invention that instead of using a demagnetized copy medium when an A. C. excitation is used to produce a magnetic transfer field, it is also possible to use a copy medium which is saturated with a D. C. magnetization. Since this combination method is fully disclosed in my above-mentioned copending application further disclosure is believed unnecessary here.

In following my novel method of transferring a magnetic pattern from a master to a paramagnetic copy material, it is of considerable advantage to employ record media having certain specific characteristics.

For example, it has been customary in the art to use a multiplicity of kinds of magnetic media including coated tape and film, wire and solid metallic tape. However, I have found that my method of producing duplicate magnetic records may be successfully pursued with any of the various record media provided certain prerequisites are met and certain precautions are observed.

It is important to employ a master record having a high coercive force (preferably as high as 750–1,000 oersteds) so that the master will not be adversely affected by a high frequency A. C. transfer field. The coercive force of the master record is determined to a great extent by the coercive force of the copy so that in some cases lower values may be used.

The master record should also have a sufficiently high retentivity ($B_r$) so as to permit a complete magnetization of the copy material. A representative value of $B_r$ may lie in the range of 15000–5,000 gauss. The master record should, in addition, have a high $H_0$ value. An $H_0$ value is defined as the minimum value of field where retentivity is obtained.

Master records displaying these characteristics may be produced as fully disclosed and claimed in my copending application Serial No. 58,403, filed November 5, 1948. These physical characteristics relate particularly to the type of backing material, the coating material and also to the characteristics of a solid tape master record.

Before using the master record for producing duplicate records, it is highly desirable that the magnetized master record be subjected to an A. C. field equal in quantitative strength to that used in the A. C. transfer field plus the field induced into the copy material for the purpose of "aging." It has been found that this precautionary step stabilizes the characteristics of a master record and operates to prevent portions of the copy record from being retransferred to the master record in case relative slippage between the two record media occurs while the records are passing through the magnetic transfer field.

The copy material may take any desired form usually employed as magnetic record media but should have a sufficiently high coercive force and retentivity value ($B_r$) to give satisfactory output and frequency response when the finished duplicate record is played back on a magnetic record reproduction unit. However, the $H_0$ value of the copy material should be low enough so that the strength of the transfer field required will not approach the coercive force of the master record too closely. By way of generalization, it is desirable that the coercive force of the copy material be one-third to one-half that of the master record, or less. As a matter of practice, the $H_0$ of the copy material preferably lies in the range of 200-300 oersteds, although satisfactory results are obtainable with a much lower value of $H_0$. Excellent copy records have been made having a coercive force as high as 360 oersteds.

It is further preferable that the copy material be of low permeability so as to permit a high percentage of the magnetic field present in the master record to pass through the copy material when they are within the magnetic transfer field.

The copy material should also have a high $H_0$ value with low retentivity at fields below the $H_0$ value so as to minimize the possible transfer of the magnetic pattern of a duplicate record after it has been magnetized and coiled up on a storage spool.

Although my method of transferring a magnetic pattern from a master record to a paramagnetic copy record has been described in connection with the A. C. method, the D. C. method, and the combination method, the A. C. method probably affords inherently greater possibilities for variable control, as for example, is evidenced by the various types and qualities of magnetic transfer fields available. However, in the A. C. method of duplication, it is preferable to use a high frequency magnetic transfer field. It has been found that the use of a high frequency field avoids the possibility of recording a sound corresponding to the A. C. frequency on the duplicate record, thereby producing an audible interference noise which greatly affects the utility of a sound recording.

It has also been found that the strength of magnetic transfer field should lie at a value less than the $H_0$ value of the master, and preferably should lie at approximately one-half the value of the coercive force ($H_0$) of the master record medium or less. The field should also be higher than two-thirds the $H_0$ value of the copy medium and should preferably lie at a value between one and one-quarter to one and one-half times the coercive force ($H_0$) of the copy material. Higher values may be employed without producing deleterious results only under special conditions.

It may be noted at this point that a master record having the characteristics recommended in this description and following the characteristics disclosed in my copending application, properly aged and used in connection with and in the manner described will last indefinitely. The magnetic pattern existing in the master record will not deteriorate in quality despite repeated exposure to magnetic transfer fields during the duplicating operation.

It will also be apparent to those skilled in the art that I have described a method whereby a predetermined magnetic pattern may be transferred from a master magnetic medium to a paramagnetic copy material with great efficiency and rapidity thereby making possible the production of copy duplicates in an economical and convenient manner.

While I have disclosed a particular form of duplicating head in Figure 2 for the duplication of several copies of intelligence utilizing a multiple channel copying head of this embodiment, it is also to be understood that the embodiments of Figures 1 and 3 may also be similarly modified to produce multiple channels by constructing the magnetic cores 15 and 16 with non-magnetic spacers 28.

While I have resorted to detail in the description of my invention for the sake of clarity, it will, of course, be understood that many modifications with respect to various details will suggest themselves to those versed in the art which will not mark a departure from the true spirit of my invention. I desire to be limited, therefore, only by the scope of the appended claims and the prior art.

I claim as my invention:

1. A magnetic transfer apparatus wherein a magnetic pattern is transferred from a master magnetic medium to a paramagnetic copy medium comprising, in combination, a master magnetic medium, a paramagnetic copy medium, means for producing a magnetic transfer field, said transfer field producing means being interposed between said master magnetic medium and said paramagnetic copy medium.

2. A magnetic transfer apparatus wherein a magnetic pattern is transferred from a master magnetic medium to a paramagnetic copy medium comprising, in combination, complementally formed excitation elements for producing a magnetic transfer field and forming an upper and a lower non-magnetic gap contiguous respectively to the master magnetic medium and the paramagnetic copy medium, and an adjustable spring press for placing said master medium in contact with said copy medium respectively at their contiguous non-magnetic gaps, and means for exciting the aforesaid excitation elements for producing a magnetic transfer field.

3. A magnetic transfer apparatus wherein a magnetic pattern is transferred from a master magnetic medium to a paramagnetic copy medium comprising, in combination, excitation elements for producing a magnetic transfer field comprising complementally formed magnetic core material including non-magnetic spacers forming an upper and lower non-magnetic gap contiguous respectively to the paramagnetic copy medium and the master magnetic medium, an adjustable spring press for placing said master medium and the copy medium in contact with the magnetic transfer field at the aforesaid non-magnetic gaps of the aforesaid magnetic transfer field, and means for exciting the excitation elements for producing a magnetic transfer field.

4. A magnetic transfer apparatus wherein a magnetic pattern is transferred from a master magnetic medium to a paramagnetic copy medium comprising, in combination, similarly formed excitation elements for producing a magnetic transfer field spaced apart and forming non-magnetic gaps contiguous respectively to the copy medium and to the master magnetic medium, an additional transverse magnetic field interposed between the aforesaid parts of the magnetic transfer field, an adjustable spring press for placing said master medium and the copy medium in contact with the aforesaid magnetic transfer field at the aforesaid non-magnetic gaps, and excitation means whereby a circulating field is set up within the magnetic transfer field and the second mentioned transverse magnetic field sets up a field which aids in the gap which is adjacent to the copy record and which cancels in the gap adjacent the master record.

5. In a magnetic transfer apparatus wherein a magnetic pattern is transferred from a master magnetic medium to a paramagnetic copy medium, a transfer magnet defining a head portion having spaced non-magnetic gaps, master and copy mediums contacting said head portion at the respective spaced gaps, each medium contacting the head portion at only one gap, the gaps being less than the wave lengths of an intelligence pattern to be transferred from said master medium to said copy medium between which the transfer magnet is interposed.

6. As an article of manufacture, a transfer magnet adapted for use in producing duplicate magnetic records, said transfer magnet including a head member and exciting elements for producing a magnetic transfer field, said head member defining an upper and a lower non-magnetic gap, and a master magnetic medium traveling over one of the gaps and a paramagnetic copy medium traveling over the other of said gaps with the transfer magnet interposed therebetween.

7. As an article of manufacture, a transfer magnet adapted for use in producing duplicate magnetic records, said transfer magnet including a head member comprising symmetrically positioned magnetic core members, a conducting shim interposed therebetween forming an upper and lower non-magnetic gap and adapted when excited for producing a magnetic field within the transfer magnet and said magnetic core members, said shim comprising non-magnetic spacers, a master magnetic medium traveling over one of said gaps and a paramagnetic copy medium traveling over the other of said gaps, the transfer magnet being interposed between the said master magnetic medium and said paramagnetic copy medium to duplicate a plurality of intelligence patterns from said master magnetic medium.

8. As an article of manufacture, a transfer magnet adapted for use in producing duplicate magnetic records from a master record medium to a copy medium, said transfer magnet including symmetrically positioned magnetic cores spaced apart forming a master and a copy non-magnetic gaps, a transversely positioned magnetic core between the aforesaid magnetic cores, and excitation elements on the aforesaid cores said excitation elements including means for producing a circulating flux through said magnetic transfer head and a flux through said transversely positioned core and said transfer head which aids said first flux in the region of said copy gap and opposes said first flux in the region of said master gap.

9. Apparatus for producing duplicate magnetic records comprising: A master record containing a magnetic flux pattern representative of recorded intelligence, a blank copy record upon which the recorded intelligence is to be duplicated, means, including a ferro-magnetic circuit, for directly conducting a portion of the flux of the master record into magnetic relationship with a portion of the copy record, and means for simultaneously magnetically biasing at least the said portion of the copy record.

10. Apparatus for producing duplicate magnetic records comprising: A high coercive force master record containing a magnetic flux pattern representative of recorded intelligence, a blank copy record having a coercive force substantially less than the coercive force of said master record upon which the recorded intelligence is to be duplicated, means, including a ferro-magnetic circuit, for directly conducting a portion of the flux of the master record into magnetic relationship with a portion of the copy record, and means for simultaneously magnetically biasing at least the said portion of the copy record.

11. Apparatus for producing duplicate magnetic records comprising: A master record containing a magnetic flux pattern representative of recorded intelligence, a blank copy record upon which the recorded intelligence is to be duplicated, means, including a ferro-magnetic circuit having a pair of spaced non-magnetic gaps therein over which said master record and said copy record, respectively, are arranged to pass, said ferro-magnetic circuit directly conducting a portion of the flux of the master record into magnetic relationship with a portion of the copy record, and means for simultaneously magnetically biasing at least the said portion of the copy record.

12. Apparatus for producing duplicate magnetic records comprising: A master record containing a magnetic flux pattern representative of recorded intelligence, a blank copy record upon which the recorded intelligence is to be duplicated, means, including a ferro-magnetic circuit, for directly conducting a portion of the flux of the master record into magnetic relationship with a portion of the copy record, and means supplying a unidirectional magnetic biasing flux at least at said portion of the copy record.

13. Apparatus for producing duplicate magnetic records comprising: A master record containing a magnetic flux pattern representative of recorded intelligence, a blank copy record upon which the recorded intelligence is to be duplicated, means, including a ferro-magnetic circuit, for directly conducting a portion of the flux of the master record into magnetic relationship with a portion of the copy record, and means supplying a high frequency alternating magnetic biasing flux at least at said portion of the copy record.

14. Apparatus for producing duplicate magnetic records comprising: A master record containing a magnetic flux pattern representative of recorded intelligence, a blank copy record upon which the recorded intelligence is to be duplicated, means, including a ferro-magnetic circuit, for directly conducting a portion of the flux of the master record into magnetic relationship with a portion of the copy record, and means for simultaneously magnetically biasing said portion of the copy record and for also magnetically biasing a portion of the flux conducted through said ferro-magnetic circuit in a region thereof spaced from said portion of the copy record.

MARVIN CAMRAS.

References Cited in the file of this patent

UNITED STATES PATENTS

| Number | Name | Date |
|---|---|---|
| 1,828,190 | Kiliani | Oct. 20, 1931 |
| 2,195,192 | Schuller | Mar. 26, 1940 |
| 2,210,770 | Miller-Ernesti | Aug. 6, 1940 |
| 2,539,876 | Von Behren | Jan. 30, 1951 |

OTHER REFERENCES

"Electronics," Dec. 1949, pages 78–83.